(12) United States Patent
Wilson

(10) Patent No.: US 7,019,882 B1
(45) Date of Patent: Mar. 28, 2006

(54) GENERATION OF M-ARY DIGITAL SIGNALING CONSTELLATIONS DIRECTLY AT LIGHTWAVE FREQUENCIES

(75) Inventor: Kenneth E. Wilson, Centennial, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/394,077

(22) Filed: Mar. 21, 2003

Related U.S. Application Data

(60) Provisional application No. 60/366,293, filed on Mar. 21, 2002.

(51) Int. Cl.
*G02F 1/15* (2006.01)

(52) U.S. Cl. .................. 359/265; 359/237; 359/238; 359/279; 359/276

(58) Field of Classification Search ............. 359/237, 359/265, 238, 279, 276; 398/188
See application file for complete search history.

(56) References Cited

U.S. PATENT DOCUMENTS

| | | | | |
|---|---|---|---|---|
| 636,580 | A * | 11/1899 | Stephens, Sr. et al. | 431/111 |
| 4,644,565 | A | 2/1987 | Seo et al. | 375/296 |
| 5,247,382 | A | 9/1993 | Suzuki | 359/156 |
| 5,313,494 | A | 5/1994 | Park et al. | 375/59 |
| 5,526,158 | A | 6/1996 | Lembo | 359/161 |
| 5,687,261 | A | 11/1997 | Logan | 385/24 |
| 5,724,169 | A | 3/1998 | LaGasse | 359/173 |
| 5,825,325 | A | 10/1998 | O'Donovan et al. | 342/353 |
| 6,104,346 | A | 8/2000 | Rudish et al. | 342/424 |
| 6,194,963 | B1 | 2/2001 | Camp, Jr. et al. | 330/149 |
| 6,204,951 | B1 | 3/2001 | Coward et al. | 359/245 |
| 6,221,565 | B1 | 4/2001 | Jain et al. | 430/321 |
| 6,242,970 | B1 | 6/2001 | Grant et al. | 327/536 |
| 6,298,099 | B1 | 10/2001 | Resnikoff et al. | 375/322 |
| 6,310,709 | B1 | 10/2001 | Bergano | 359/183 |
| 6,356,580 | B1 * | 3/2002 | Stephens et al. | 375/141 |
| 6,356,673 | B1 | 3/2002 | Burns | 385/2 |
| 6,370,290 | B1 | 4/2002 | Ball et al. | 385/14 |
| 6,385,360 | B1 | 5/2002 | Kambe | 385/14 |
| 2002/0080884 | A1 * | 6/2002 | Lee et al. | 375/261 |
| 2002/0145787 | A1 * | 10/2002 | Shpantzer et al. | 359/136 |
| 2002/0159121 | A1 * | 10/2002 | Spickermann | 359/188 |
| 2003/0091097 | A1 * | 5/2003 | Yap et al. | 375/132 |

OTHER PUBLICATIONS

Simon, M.K. and Divsalar, D. "A Reduced-Complexity, Highly Power-/Bandwidth-Efficient Coded Feher-Patented Quadrature-Phase-Shift-Keying System with Iterative Decoding". TMO Progress Report 42-145. May 15, 2001. pp. 1-17.
Simon, M.K. and Divsalar, D. "Further Results on a Reduced-Complexity, Highly Power-/Bandwidth-Efficient Coded Feher-Patented Quadrature-Phase-Shift-Keying System with Iterative Decoding". IPN Progress Report 42-146. Aug. 15, 2001. pp. 1-7.
Johnson, M. et al. "Bandwidth-Efficient Modulation Through Gaussian Minimum Shift Keying". Crosslink. The Aerospace Corporation magazine of advances in aerospace technology. http://www.aero.org/publications/crosslink/winter2002/03.html.
Swanson et al. "High Sensitivity Optically Preamplified Direct Detection DPSK Receiver with Active Delay-Line Stabilization". IEEE Photonics Technology Letters, vol. 6, No. 2 Feb. 1994.

* cited by examiner

*Primary Examiner*—Ricky L. Mack
*Assistant Examiner*—Brandi Thomas
(74) *Attorney, Agent, or Firm*—Kenneth W. Float; Robert B. Berube; Robert G Crouch

(57) ABSTRACT

A coherent optical link includes a laser master oscillator operative to generate an amplitude- and phase-stable narrow linewidth optical carrier, a first programmable read-only memory (PROM) having an input for receiving and encoding an M-ary data word, a first digital-to-analog (D/A) converter operative to obtain the amplitude-encoded M-ary data word and output a corresponding analog signal, a Mach-Zehnder intensity modulator that obtains the analog signal and intensity-modulates the carrier based on the analog signal, an optical phase modulator having an input, and an optical waveguide that connects the Mach-Zehnder intensity modulator to the input of the optical phase modulator. The Mach-Zehnder intensity modulator and optical phase modulator may be formed into a single package. A modulation method includes modulating an intensity of an optical signal using a Mach-Zehnder intensity modulator, and then modulating the phase of the intensity-modulated optical signal.

40 Claims, 3 Drawing Sheets

GENERATION OF M-ARY DIGITAL SIGNALING CONSTELLATIONS DIRECTLY AT LIGHTWAVE FREQUENCIES

CROSS-REFERENCE TO RELATED APPLICATIONS

This application claims priority from U.S. Provisional Patent Application No. 60/366,293, filed Mar. 21, 2002, entitled "GENERATION OF M-ARY DIGITAL SIGNALING CONSTELLATIONS DIRECTLY AT LIGHTWAVE FREQUENCIES", the contents of which are incorporated herein by reference.

FIELD OF THE INVENTION

The present invention relates generally to modulation of optical signals and, more particularly, to techniques for coherent M-ary modulation.

BACKGROUND OF THE INVENTION

Optical communication typically involves an optical signal such as a beam of light in the ultraviolet, visible, or infrared wavelengths that has a characteristic that is varied or modulated. This modulated characteristic may be the intensity (amplitude), the phase, the frequency, the polarization, the location or duration of a pulse of light, and so forth. The pattern of modulation represents the information conveyed on the optical communication system. At one end of the optical communication system may he a source of light and a means for modulating the tight output from the source. At another end of the optical communication system may be an optical receiver and a means for demodulating the received optical signal.

Information in a communication system is conveyed by first representing the information in some unambiguous digital form, where unambiguous means that the conversion from the information to the digital form and from the digital form back to the information is one-to-one. For example, one such mapping is the ASCII encoding of text. The digital form is then used to select members from a set of (usually orthonormal) basis vectors (or basis functions) to represent the digital data. This process falls under the general topic of geometrical representation of signals (see Section 7.1, page 548 of Modern Digital and Analog Communication Systems, B. P. Lathi, Holt, Reinhart and Winston, 1983 and/or Section 3.2, page 157 of Digital Communications, Second Edition by John G. Proakis, McGraw-Hill, 1989). The complete set of basis vectors used is typically called the signal constellation.

The M in M-ary comes from the use of M such basis vectors in the signal space. When M=2, then there are 2 such basis vectors, one is using Binary signaling, and is sending one bit per symbol. When M=4, then there are 4 such basis vectors, one is using Quaternary signaling, and is sending 2 bits per symbol. When M=8, one is sending 3 bits per symbol, and so on. In general the number of bits per symbol is given by computing the logarithm base 2 of M (Lathi, op. cit. page 177). The usual use of the term M-ary refers to signal constellations with more than 2 basis vectors: that is, M>2.

Bandwidth efficient modulation (BEM) techniques have been developed in response to the need for ever-higher communication link data rates in the presence of fixed bandwidth frequency authorizations for the transmission of the data. The essential relationship between data rate and bandwidth is encapsulated in the term Bits per Hertz. Each modulation type has a definable value of Bits per Hertz. For example, Binary Phase Shift Keying (BPSK) has a Bits per Hertz value of 0.5, while Quaternary Phase Shift Keying (QPSK) has a Bits per Hertz value of 1.0. Bandwidth efficient modulation techniques are able to achieve Bits per Hertz values of more than 4. The penalty for using BEM techniques is twofold. The modulator and demodulator used in generating the transmitted signal and in recovering the data from the received signal have increased technical complexity. And BEM techniques require ever higher received signal power in order to provide the same bit error rate as the value of Bits per Hertz increases. This higher received signal power must be made up through a combination of higher transmitter power and higher antenna gains (requiring larger transmit and receive antenna sizes). These two penalties increase the expense of building and maintaining the communication link.

Conventional methods that implement BEM communications systems generate the signal constellation at intermediate radio frequencies (IF) using vector modulators, usually driven by the output of a pair of digital-to-analog (D/A) converters, which are, in turn, driven by the output of programmable read-only memories (PROMs). The input to the PROMs is the bitwise representation of the BEM symbol to be converted. This technique may be used to generate any of several popular signal formats, such as PSK (4-, 8-, 16, . . . ), QAM (4-, 8-, 16-, 32-, 64-, 128, 256, . . . ), 12, 4 SQAM, and others including BPSK, QPSK, and DPSK.

An SQAM method is disclosed in U.S. Pat. No. 4,644,565 granted to Dr. J. S. Seo and Dr. K. Feher. U.S. Pat. No. 5,313,494 granted to Park et al. improves aspects of the Seo et al. modulation method, such as by reducing a probability of error. The contents of each of these patents is incorporated herein by reference.

The enormous bandwidths of optical (or photonic) communications systems, and a desire for low cost systems, have resulted in a present commercial use of relatively simple signaling equipment and simple modulation types. Most ground-based and space-based commercial and military systems use amplitude modulation, either by directly modulating the intensity of the laser light of a laser diode, or by using Mach-Zehnder modulation of a master laser, to modulate at the transmission end of the optical communication system, as is well known. At the receiver end of the optical communication system, the conventional method then uses direct photodiode detection of the intensity variation to recover the original signal modulation waveform. This approach, in general, is used in all the commercial multi-gigabit per second communication links, including those employing wavelength division multiplexing (WDM) to combine multiple data links on a single optical fiber. This conventional technique is also used for vestigial-sideband modulated (VSM) multi-channel cable TV over optical fiber networks. The communication method used in these systems is called intensity modulated, direct detection (IMDD). This communication signaling method is known as a "non-coherent modulation" technique.

On the other hand, it is well-known in the communications arts that coherent modulation techniques offer a 3 dB to 6 dB reduction in the amount of carrier power required to achieve the same bit error rate (BER) as compared to non-coherent modulation techniques. Further, when one is bandwidth constrained, coherent modulation techniques can pass four or five times the data in the same bandwidth at the same BER than one can pass using non-coherent techniques.

A problem with conventional coherent modulation techniques, however, is that they all require the use of a phase locked loop to implement the demodulation.

There are some quasi-coherent techniques that use the signal itself as a phase reference, such as by encoding the data so that the phase change between successive signals is the important parameter. This quasi-coherent technique allows the current bit to be decoded by using a time-delayed version of the previous bit, where both bits are then fed to a phase comparator. Differential phase shift keying (D-PSK) is an example of this quasi-coherent modulation technique. A simple, high-performance implementation of a D-PSK modulator and demodulator that can be used at optical frequencies has been developed by MIT/Lincoln Labs (E. A. Swanson, J. C. Livas, and R. S. Bondurant. "High Sensitivity Optically Preamplified Direct Detection DPSK Receiver with Active Delay-Line Stabilization." IEEE Photonics Technology Letters, Vol. 6, No. 2. pp 263–265, Feb. 1994).

Turning again to coherent modulation, development of the phase locked loop required for demodulation of coherent signaling formats at radio frequencies has become a highly specialized technical specialty within the communications field. Phase locked loops at radio frequencies are generally based on a voltage-controlled oscillator (VCO), a radio frequency generator whose output frequency depends on the value of an input voltage. A central part of the conventional VCO is a varactor diode, which is a voltage-variable reactor-capacitor that is constructed using a back-biased diode. The varactor is bridged across the oscillator's tank circuit, which may be an inductor-capacitor resonant type circuit, a mechanical crystal type circuit, or a multi-vibrator resistor-capacitor time constant type circuit. The varactor can be modulated at a high rate, allowing it to closely follow the frequency and phase of the signal that is being locked into the phase locked loop. Unfortunately, there is no similar device that operates at optical frequencies to make the optical output frequency a function of an applied voltage. Low speed devices have been built that use the piezoelectric effect to physically adjust the length of a laser cavity. However, these piezo devices have not demonstrated the tracking speed required to allow the optical phase locked loop to lock to the phase of an input signal.

Traditionally, when using a coherent modulation scheme at optical frequencies and when optimizing performance of the communication system for highest sensitivity, complex (where the term complex is used in the mathematical sense of the real and imaginary representation of orthogonal baseband signals—the in-phase and quadrature components) amplitude and phase demodulation is performed at optical frequencies using homodyne detection. This requires the use of an optical phase locked loop. Since an optical phase locked loop demodulator of this type is expensive and difficult to manufacture, coherent modulation is not practical for the commercial market, but has potential applicability for military applications where performance is often more important than cost.

Coherent modulation techniques have been developed in the field of laser communications. Binary amplitude shift keyed, binary phase shift keyed, and quadrature phase shift keyed signals have conventionally been generated using Mach-Zehnder interferometers as modulators. The generation of phase shift keyed signals has conventionally taken advantage of the fact that the early Mach-Zehnder modulators had a simultaneous amplitude and phase modulation characteristic. The simultaneous amplitude and phase modulation was a result of an inability to make the two legs of the Mach-Zehnder modulators exactly equal in terms of the number of wavelengths. This inability was due to limitations in the state of the art of thin film lithography. However, by using a single Mach-Zehnder modulator, four equal amplitude signals with phases at 0, 90, 180, and 270 degrees could be produced. By using signals spaced at 180 degrees, binary phase shift keyed signals could be generated. By using signals spaced at 90 degrees, the four signal states needed to represent quadrature phase shift keyed signals were available.

Improvements in lithography and in precision of manufacturing have resulted in the production of a zero phase Mach-Zehnder modulator, where the length of the legs of the interferometer are matched. This development was driven by technical requirements flowing out of competition in the commercial marketplace. In order to implement dense WDM fiber optic communication systems even when using low dispersion or dispersion compensated fibers, it is necessary to minimize the bandwidth of each of the signals. The presence of simultaneous amplitude and phase modulation on intensity-modulated optical carriers, when transmitting using existing optical fibers over significant distances, may cause inter-symbol interference in the communication channel, which increases the bit error rates to values that are unacceptable for commercial quality-of-service (QOS) standards. The simultaneous amplitude and phase modulation may also cause adjacent channel interference that also produces elevated values of bit error rates. These problems of the spreading of the signal symbols with distance and the spreading of energy into adjacent channels are reduced if there is no phase modulation accompanying the amplitude modulation.

In ground-based optical communication systems, it is current practice to recover data to the electronic signaling level after each link span. The recovered data is then passed to an electronic cross-connect if the link-to-link node is a relay or repeater node. The output of the electronic cross-connect is then passed into the modulator for the next link. If the link-to-link node is a routing node, then the recovered data is passed to the input of a switch. Depending on the destination of the packets, the output of the switch can go to one of N possible output ports.

In optical communication systems between satellites in space, known as inter-satellite links (ISL), conventional signaling methods require the demodulation and remodulation of the data aboard a satellite, which then also requires a high data rate digital switch or space-qualified digital router. Unfortunately, these data handling/data routing components are excessively heavy in weight and consume too much power.

Another issue with ISL systems relates to transitions between RF and optical communications systems. In order to help reduce the size of a satellite link, conventional RF communication relay satellites may use a transponder/bent-pipe architecture which only requires an IF switch matrix to route data to other crosslinks to the downlink. For example, U.S. Pat. No. 5,825,325 granted to O'Donovan et al., incorporated herein by reference, discloses combining an intersatellite link with on-board subchannel switching capability, so that a bent-pipe intersatellite linked system maximizes the bandwidth efficiency of the intersatellite link. However, an optical ISL architecture which is compatible with the RF bent-pipe architecture is needed in order to assist in a transition for military space communication systems from RF to optical links. In conventional systems, there is no method for a heterodyne-up conversion from an IF frequency to a photonic frequency.

It is against this background and with a desire to improve on the prior art that the present invention has been developed.

SUMMARY OF THE INVENTION

In view of the foregoing, a broad objective of the present invention to generate M-ary digital signaling constellations directly at lightwave frequencies.

It is another object of the present invention to provide a method and apparatus that may be used for generating signal vectors that make up the basis vectors in signal constellations used in coherent M-ary modulation.

It is also an object of the present invention to generate any of the BEM constellations directly at the optical carrier.

It is a further object of the present invention to provide a laser communication system transceiver having greatly improved efficiency.

In order to meet these and other objectives, the present invention recognizes the benefit of providing a coherent converter method and system that does not require a use of optical wavelength division multiplexing (WDM), but is compatible with optical WDM, and that has no crosstalk concerns. The use of the coherent converter replaces components in conventional RE based communication systems, and reduces or eliminates intermodulation products generated by these components.

In a first aspect of the present invention, a method generates any of the BEM constellations directly at the optical carrier, by using an intensity modulator in sequence with a phase modulator.

In a second aspect of the present invention, a modulation method includes generating basis vectors in constellations of bandwidth efficient modulation schemes at optical wavelengths.

In a third aspect of the present invention, a method of generating the amplitude and phase states used in bandwidth efficient modulation (BEM) signal constellations includes using a Mach-Zehnder intensity modulator followed by an optical phase modulator. This combination of apparatus makes possible the generation of any of the BEM constellations directly at the optical carrier.

In a fourth aspect of the present invention, an optical link includes a laser master oscillator that generates an amplitude- and phase-stable narrow linewidth optical carrier, a programmable read-only memory (PROM) having an input for receiving an M-ary data word and being operative to amplitude-encode the M-ary data word, a digital-to-analog (D/A) converter operative to obtain the amplitude-encoded M-ary data word and output a corresponding analog signal, and a Mach-Zehnder interferometer having an analog input that obtains the analog signal and intensity-modulates the carrier based on the analog signal.

In a fifth aspect of the present invention, an optical link may also include an optical phase modulator having an input, and an optical waveguide that connects a Mach-Zehnder interferometer to the input of the optical phase modulator.

In a sixth aspect of the present invention, an optical link may have a receiver that includes a downconverter operative to downconvert the optical signals to signals in the radio frequency (RF) range, and a demodulator operative to demodulate the downconverted signals and recover the M-ary data word. Such a configuration may avoid a need for an optical phase locked loop.

As a result of implementing the present invention, RF electronics and associated system complexities, cost, power consumption, weight, and potential RF-type problems are all avoided. For example, by using a heterodyne downconverter at a relay satellite, the IF conventionally used in a bent pipe switching matrix is created from the optical signal and fed directly to the downlink just as though it came from an RF uplink or crosslink: the fact that it came to the satellite on an optical link is made transparent to the communications architecture of the satellite.

By using an intensity modulator and a phase modulator in sequence, any of the BEM constellations can be generated directly at the optical carrier. The resulting architecture is compatible with existing RF architecture, allowing for a smooth transition for conventional RF systems to a use of a direct photonic M-ary digital signaling constellation generator.

This summary does not limit the invention, which is instead defined by the appended claims.

BRIEF DESCRIPTION OF THE DRAWING FIGURES

The above and other objects and advantages of the present invention will become more apparent by describing in detail preferred embodiments thereof with reference to the accompanying drawing FIGS. in which.

DETAILED DESCRIPTION OF A PREFERRED EMBODIMENT

Figure 1:
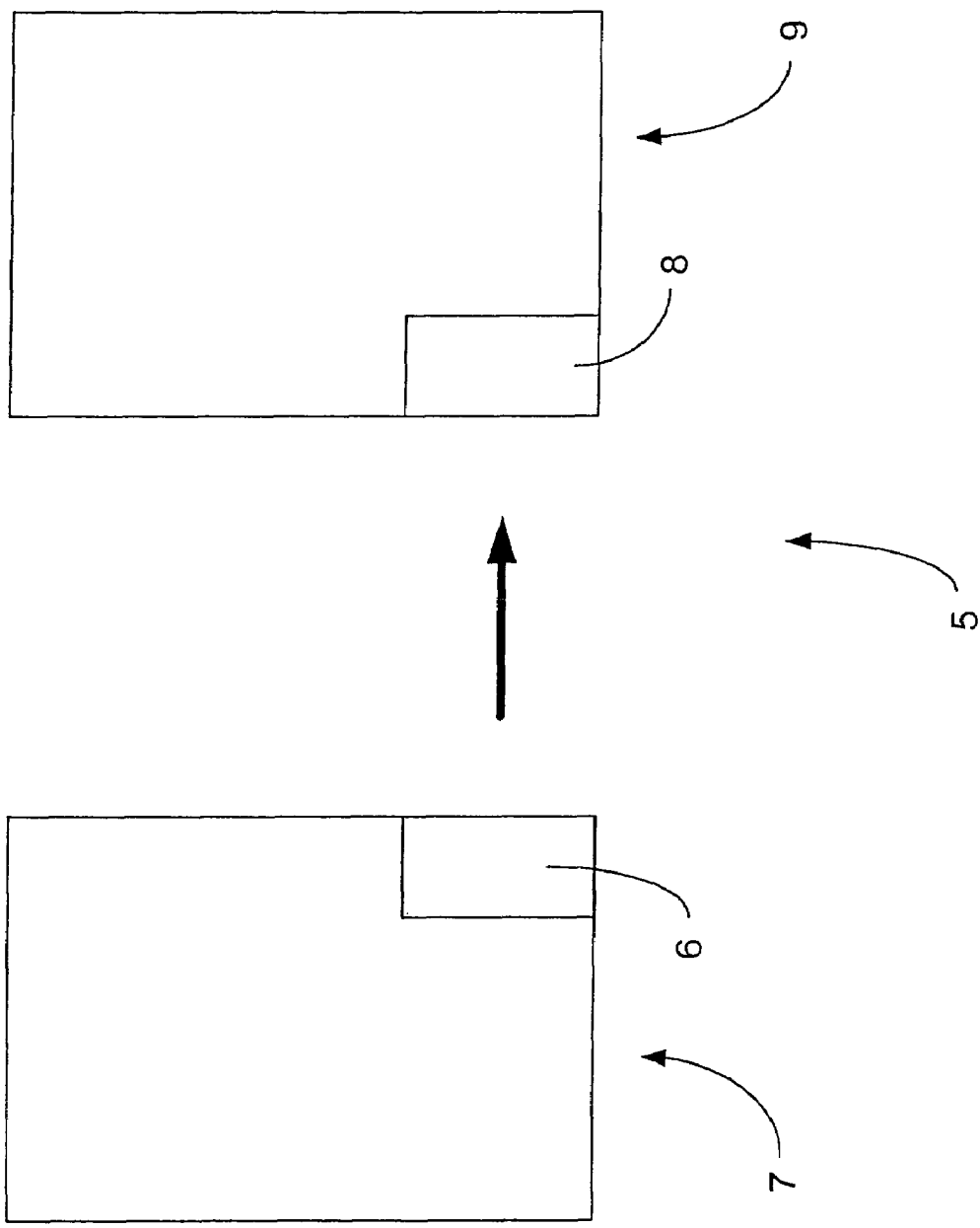
FIG. 1 is a block diagram of an optical communication system of the present invention.

An optical communication system 5 of the present invention includes an optical transmitter 6 that may reside on a first satellite 7. as shown in FIG. 1. The transmitter 6 transmits an optical signal that propagates through space to an optical receiver 8 that may reside on a second satellite 9. Of course, a more practical system might include both a transmitter 6 and a receiver 8 on each of the satellites 7 and 9. but the system is shown in simplified form in FIG. 1 for ease of illustration. Although the system 5 is shown in exemplary fashion in an inter-satellite application, the present invention is equally applicable to other scenarios such as communication between space and ground and vice versa, as well as ground-to-ground scenarios. Among other things, the transmitter 6 includes a direct photonic M-ary digital signaling constellation generator and the receiver includes a frequency-locked heterodyne photonic downconverter.

Figure 2:
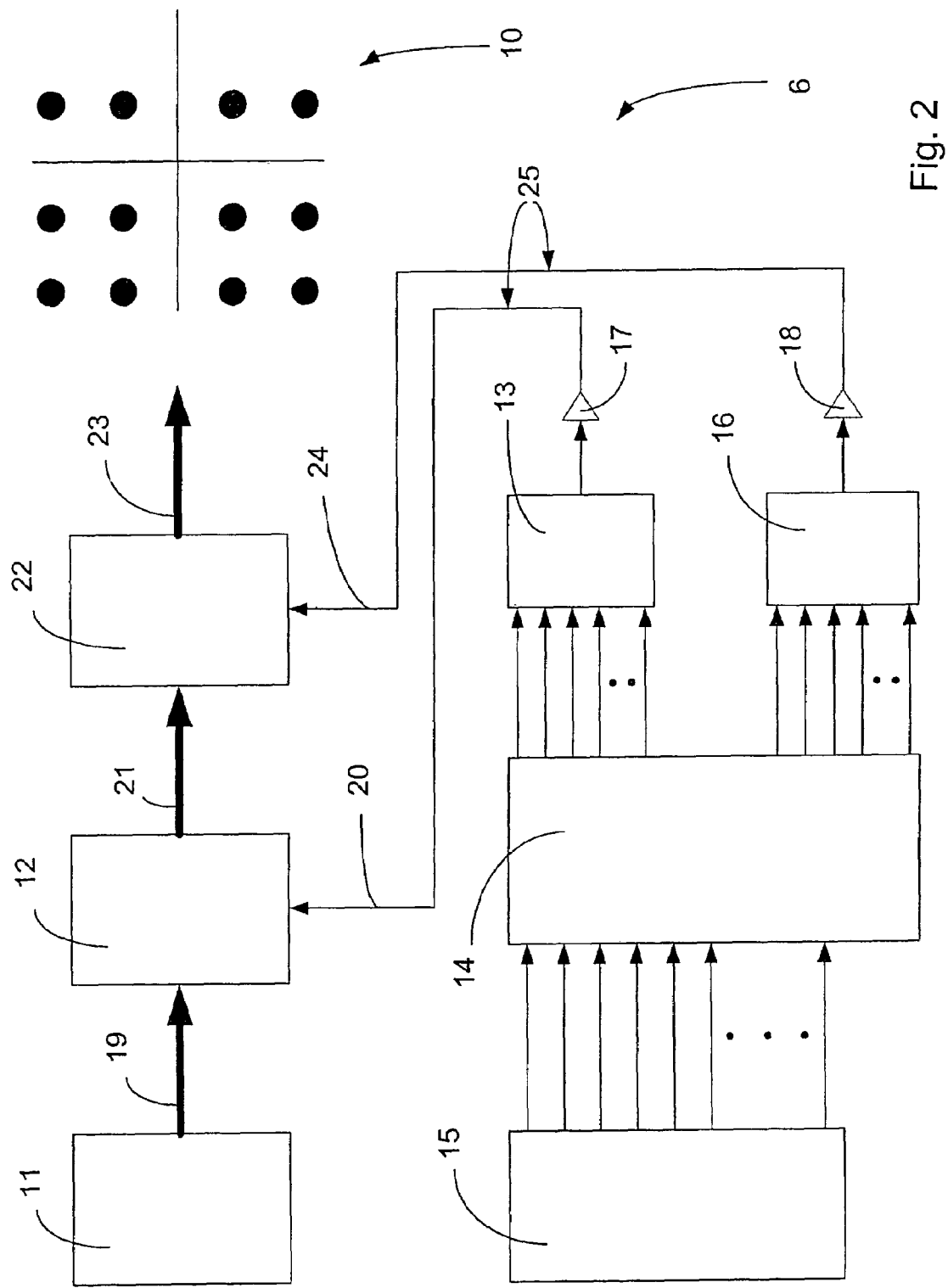
FIG. 2 is a block diagram of a direct photonic M-ary digital signaling constellation generator portion of an optical transmitter of the optical communication system of FIG. 1 in an exemplary embodiment according to the present invention.

The constellation generator is shown in further detail in FIG. 2. A laser 11, which serves as a master oscillator, generates an amplitude-stable and phase-stable narrow linewidth optical carrier signal 19. The laser 11 of a preferred embodiment is based on monolithic non-planar ring oscillator (NPRO) cavity technology developed by Lightwave Electronics. Exemplary products are Lightwave's Model Nos. 125 and 126. The solid-state laser 11 may preferably operate in the erbium doped amplifier hand, nominally having a wavelength of 1.54 microns, although wavelengths of 1.064 microns and 1.319 microns are commercially available in either a CW fiber-coupled or free-space (non-fiber) version. The laser 11 has a linewidth that is less than 5 kHz (over 1 msec), with a calculated coherence length greater than 1000 meters. The laser II has a $TEM_{00}$ spatial mode and a single frequency longitudinal mode. Amplitude noise is preferably less than 0.1% rms, and is more preferably less than 0.05% rms. When the optical signal 19 from the laser 11 is via an optical fiber, the fiber should have a pigtail length of greater than two meters and a fiber pigtail connector (not shown) that provides an alignment key parallel to the slow axis. Such a fiber pigtail connector allows the laser transmission to have a linear polarization greater than 30:1, parallel to the connector key. Such polarization control and purity is important to minimizing losses when coupling to the Mach-Zehnder modulator and the Phase Modulator, and is critical to achieving good transmit/receive optical isloation isolation in the ISL transceiver. Circular polarization is used on the light signal that propagates between the two terminals. On the other hand, the light is linearly polarized for the Mach-Zehnder and the phase modulators and also to allow full duplex operation through a single telescope. A quarter wave plate is used to convert the linear polarization to circular on transmission, and a second quarter wave plate is used to convert from circular to linear at the receiver.

A narrow linewidth operation of laser 11 may be obtained when optical feedback is coherent with the electric field inside the laser cavity, although this operation has been problematic for some applications, e.g., when a reduced stability causes problems due to the onset of laser cavity-mode transition noise when the laser operating characteristics change. By utilizing an ultra-stable Lightwave Electronics source, as described above, a narrow linewidth is maintained to be constant, which greatly reduces spectral width limitations of conventional systems.

The optical signal 19 is passed from the laser 11 to a Mach-Zehnder intensity modulator 12. There are several manufacturers of acceptable modulators, most of them lithium niobate based. A commercial source is the Codeon Corp Mach10 and Mach40 series of modulators. Also the JDS Uniphase model 21010278 is a zero chirp Mach Zehnder modulator. Other intensity modulators and phase modulators are made from semiconductor materials using indium aluminum gallium arsenide multi quantum wells for the 1.54 micron wavelength regime. The Mach-Zehnder intensity modulator 12 has an optical input port to receive the optical signal 19 and an analog input port that receives an analog signal 20 containing amplitude modulation information, and can intensity-modulate the optical signal 19 based on the analog signal 20. For example, when the signal constellation to be generated is a QAM type intensity-phase constellation, the analog information being input to the Mach-Zehnder intensity modulator 12 sets the symbol radius for the symbol in the constellation.

The signal constellation is generated as follows. A data source 15 produces N bits per symbol that are provided to a read-only-memory (ROM) 14. The ROM 14 provides an amplitude-encoded M-ary data word that results from the ROM 14 mapping N bits into M symbols in intensity-phase space. This digital information is provided by the ROM 14 to a first digital-to-analog (D/A) converter 13. The first D/A converter 13 obtains the digital amplitude-encoded M-ary data word and outputs the corresponding analog signal 20 to the Mach-Zehnder intensity modulator 12 via an in-line amplifier 17. An intensity-modulated optical signal 21 from the Mach-Zehnder intensity modulator 12 passes via optical fibers to an optical input port of an optical phase modulator 22. The optical phase modulator 22 also has an analog input port for receiving an analog signal 24 containing phase information from a second D/A converter 16 via an in-line amplifier 18. The phase modulator 22 phase modulates the intensity-modulated optical signal 21 based on the analog signal 24 containing the phase information. For example, when the constellation to be generated is a QAM type intensity-phase constellation, the phase information being input to the optical phase modulator 22 sets a symbol angle for the phase modulation. JDS Uniphase part number 10023874 is a 10 GHz bandwidth fiber optic pigtailed with polarization controlled fiber phase modulator. It is constructed using lithium niobate as the electro-optical active material. There are phase modulators based on the electro absorption modulator technology constructed out of indium aluminum gallium arsenide multi quantum wells.

The optical fibers carrying the optical signal 21 may be alternatively be replaced by an optical waveguide fabricated on an integrated Mach-Zehnder/phase-modulator or by an optical waveguide fabricated on an electro absorption modulator/phase modulator device. Alternatively, the electro absorption modulator/phase modulator device may utilize the optical fibers 21 with a predetermined length.

The phase information in the analog signal 24 provided to the optical phase modulator 22 sets a phase angle for the symbol being generated. The second D/A converter 16 also receives digital information from the ROM 14 in a manner that is the same or similar to that for the first D/A 13, the information being a phase-encoded M-ary data word that results from the ROM 14 mapping N bits into M symbols in intensity-phase space. RF transmission lines 25 provide paths for the respective amplitude and phase setting signals 20 and 24 from D/A converters 13 and 16 to intensity modulator 12 and phase modulator 22. The RF transmission lines 25 are tuned to eliminate distortion in the analog signals 20 and 24. For example, the RF transmission lines may be cut to length so that the analog signals 20 and 24 respectively cause the Mach-Zehnder intensity modulator 12 and the optical phase modulator 22 to be precisely aligned for modulating the M symbols in intensity-phase space, using known transmission line calibrating techniques. An example of such a calibration follows.

In a preferred embodiment, the voltage level for the analog signal 12 with the amplitude information is designed so that a zero volt signal achieves 50% of the maximum intensity level from the Mach-Zehnder intensity modulator 12. The signal level is controlled by the in-line amplifier 17. Similarly, the in-line amplifier 18 sets a voltage level for the analog signal 24 with the phase information to be zero volts when the phase being output by the optical phase modulator 22 is at zero. The signals from the D/A converters 13 and 16 in a preferred embodiment are provided on transmission lines 25 that pass the analog signals 20 and 24 to the modulators 12 and 22. The transmission lines 25 have respective lengths set so that an optical intensity-modulated symbol in the optical signal 21 arriving at the optical input port of the optical phase modulator 22 and a voltage defining a phase for that symbol arrive at the analog input port of the phase modulator 22 at approximately the same time. When the arrival times are set by adjusting the lengths of the transmission lines 25 to coincide as exactly as possible, the optical and electrical signals overlap nearly exactly as the intensity modulated symbol propagates through the optical phase modulator 22. Thus, the intensity modulated state of the symbol and the phase modulated state of the symbol are precisely aligned. FIG. 2 shows an exemplary 16 QAM intensity—phase constellation 10 having N=4, M=16, the constellation 10 being generated by the generator which may also be referred to as a coherent converter.

It has been discovered that the Mach-Zehnder intensity modulator 12 and the optical phase modulator 22 may achieve an accurate generation of an intensity-phase constellation when the length of the optical fibers separating the two modulators 12 and 22 is approximately three to twelve inches long, although it may be possible that other lengths might provide suitable results.

As an alternative, the amplitude modulation portion that generates the optical carrier and intensity-modulates it, could include a laser diode having an external cavity, which can he a laser diode coupled to a Bragg grating written into an optical fiber, or a laser diode coupled to a Lippman-Metcalf cavity. The combination of the laser diode and the external cavity may be sufficient to produce a narrow linewidth and frequency stable source in the presence of amplitude modulation of the laser diode output intensity as caused by modulating the drive current to the laser diode. Another alternative would be to use a laser master oscillator in combination with an eleetro absorption (EA) intensity modulator, where the EA functionally replaces the Mach-Zehnder intensity modulator.

A preferred method, however, involves separately modulating an intensity of an optical signal using a Mach-Zehnder interferometer and then modulating the phase of the resulting intensity-modulated optical signal. The optical modulators 12 and 22 each preferably have at least one optical waveguide provided on a substrate, and an electrode corresponding to the optical waveguide. An intensity-modulated external cavity laser diode followed by an optical phase modulator, or an electro absorption intensity modulator followed by an optical phase modulator can also be used.

Optical interference refers to the phenomenon that occurs when two or more distinct lightwaves are manipulated so that they overlap each other in space and time. Interferometry refers to a use of the interference phenomenon for converting the phase, frequency, or polarization property of a lightwave into a spatial-temporal power distribution. Usually, the interfering lightwaves are created by dividing the light from a single optical source using a signal splitter, which maintains a predictable phase relation (coherence) between the corresponding waves. It may be desirable to produce a 90 degree phase difference between the two optical signals. For example, by utilizing a phase-shifting power splitter (not shown) between a laser and a pair of intensity modulators, the optical carrier from the laser may be separated into I and Q components, with one of those components being 90 degrees different in phase from the other component. Once the amplitude and phase components have been separately modulated, they can be combined with a power combiner. In this manner, any of the amplitude and phase vectors in the constellation can be generated.

A typical interferometer splits the light source, modulates the optical length of one of the propagation paths, and forms a spatial-temporal power distribution by the use of interference. The optical length is the product of the physical length and the real part of the actual refractive index. Since semiconductors become anisotropic when an electric field is applied, they may be used as phase modulators that can achieve a large change in refractive index with the applied field.

An interferometer according to the present invention may be constructed with electrodes made from gold, chromium, aluminum, nickel and/or other known materials, and may be constructed using dopants that include, but are not limited to germanium, hydrogen, sodium, lithium, lead, zirconium, zinc, erbium, praseodymium, thulium, potassium, and calcium. Contacts for mating the fibers containing optical signals 19 and 21 with an interferometer can be formed from materials including, but not limited to, polysilicate, indium, tin oxide, gallium arsenide, iridium phosphate, and aluminum arsenide. An interferometer according to the present invention is preferably formed using a known lithium niobate, where optical waveguides are formed by a Ti diffusion such as, for example, by using a process similar to that disclosed in U.S. Pat. No. 6,385,360 granted to Kambe, incorporated herein by reference, or where optical waveguides are formed for increased efficiency as disclosed, for example, in U.S. Pat. No. 6,356,673 granted to Burns, incorporated herein by reference.

The Mach-Zehnder intensity modulator 12 may alternatively be constructed as an interferometer that sets the radius of the spatial symbol without changing the angle of the intensity. The phase modulator 22 then rotates the amplitude- or intensity-modulated symbol to the desired angle. It is noted that the modulators 12 and 22 may be combined into a single package. However, even in the single package, the amplitude modulator and phase modulator are maintained to be separately controllable devices. For example, by controllably adjusting the 'length' of a portion of an interferometer, e.g., in-phase or quadrature, and then combining separate portions, independent modulations may be effected.

In integrated optics, the propagation of light is generally defined by channel waveguide structures that guide lightwaves along well-defined paths in a finite number of guided modes, each having a unique "effective propagation velocity," the effective refractive index of the mode. Changes in the optical length of one of the guided propagation paths results in changes in the relative phase of the interfering waves. Phase modulating in the optical phase modulator 22 is performed by applying an electric field of approximately V/G across a channel waveguide, where V is the voltage across a waveguide of width G. The length L, of a voltage-carrying electrode adjacent the waveguide, and the voltage V determine the amount of electro-optic phase shift, so that longer phase modulators can use a smaller voltage to achieve a $\pi$ phase shift, and shorter modulators require higher voltages. It can be seen that such a phase modulator uses the product of the voltage required to reach $\pi$ times the length as the FIG. of merit.

A similar process may be used for intensity modulation by the modulator 12. In a first example, the transfer characteristic of the Mach-Zehnder intensity modulator 12 is generally nonlinear, varying sinusoidally with applied voltage. It is known to bias a Mach-Zehnder modulator electrically to a near-linear region of the transfer characteristic curve. This bias point is usually referred to as the quadrature bias point, a use of which virtually eliminates second harmonics and all other even higher-order harmonics. As explained in U.S. Pat. No. 5,526,158 granted to Lembo, incorporated herein by reference, heterodyning produces a beat frequency signal and sidebands that contain the same information as the modulating signal, but without second-harmonic distortion components. As explained herein above, the present use of an intensity modulation followed by a phase modulation obviates conventional concerns regarding sidebands.

In an alternate example, the Mach-Zehnder intensity modulator 12 may cause waveguided light from the two branches of the interferometer to interfere, the amount of interference being tunable by providing a relative phase shift on one arm with respect to the other. Light entering the modulator 12 is equally divided into the two branches, initially with zero relative phase difference. For example, when a voltage is applied across the branches, the electro-optic effect causes a phase difference between the branches, so that the recombined beam has a lateral amplitude profile of odd spatial symmetry, which is a second-order mode that is not supported in a single-mode waveguide. As a result, the light radiates into the substrate and is lost. In this manner, a linear amplitude modulator is effected, where the difference in phase between the arms of the interferometer is proportional to a difference in refractive index. Either a polarized configuration or a polarization-independent orientation may be used, though for practical free-space laser communication systems which minimize optical power loss between the laser, the intensity modulator and the phase modulator, polarized operation is required. A traveling wave electrode may be used for achieving higher speeds. Lithium niobate modulators may be used for high-speed modulation of continuous-wave (CW) diode lasers when linear modulation is required. Such modulators use the electro-optic effect, where an applied electric field changes the refractive index. Various methods of fabricating modulators into a substrate are known. Interference is usually produced only for light in one interferometer path which has traveled the same distance (to within approximately one coherence length) as light in the other path.

As noted above, the Mach-Zehnder modulator 12 may be replaced by an electro absorption (EA) modulator, in which there is an electric field dependence of the absorption, typically near the band edge of a semiconductor. EA is strong in quantum wells, which is referred-to as quantum-confined Stark effect (QCSE). The absorption spectrum of quantum wells has a peak at the "exciton resonance," so that when a field is applied, the exciton resonance moves to longer wavelengths, becomes weaker, and broadens. As a result, absorption increases with field on the long-wavelength side, as the exciton resonance moves to longer wavelengths. At wavelengths closer to the exciton resonance, absorption increases, plateaus, and then decreases. At wavelengths shorter than the zero-field exciton resonance, the absorption decreases with increasing field, as the resonance moves to longer wavelengths. Because of this general behavior, when light traverses a length of quantum well material, the transmission is a function of the applied voltage. An EA modulator has a length of waveguide containing quantum wells, the waveguide preventing diffraction. The behavior of the quantum wells allows for an on-off contrast ratio that is maintained while precisely tuning the EA modulating to an optimal wavelength region of the laser, within a wide gain spectrum. EA modulators must account for chirp that can occur at certain wavelengths. EA modulating can also be controlled for generating negative chirp for countering a chirp due to the fiber itself.

The amplitude modulation may also be obtained by using a Bragg grating that is integrated on a same chip as a laser diode. A method of constructing a tunable Bragg grating is disclosed in U.S. Pat. No. 6,221,565, granted to Jain et al., incorporated herein by reference.

In an alternate embodiment, the Mach-Zehnder intensity modulator 12 may be a modified interferometer that is adapted to also phase-modulate the carrier. In a Mach-Zehnder modulator, a phase relationship depends on modulator bias and the relative phase of the inputs. With the carrier as a reference phasor, the sidebands will rotate in opposite directions. If the sidebands are phased such that the total sideband phasor is always parallel or antiparallel to the carrier, then the result will be amplitude modulation. If the sidebands are phased such that the total sideband phasor is always perpendicular to the carrier, then the result will be mostly phase modulation with a small amount of amplitude modulation. By separating the carrier into quadrature and in-phase orthogonal components using a power splitter, two separate but co-existing modulations may be effected. Accurate modulation is achieved by using a laser master oscillator 11 to generate an amplitude- and phase-stable narrow linewidth optical carrier used by the modulator 12.

In a satellite system, a bent pipe architecture may be used for various operations, such as multiplexing of several links or channels, and duplex operation. For example, information may be transmitted on a one-way channel, and monitored at the other end of the one-way channel, as if the channel were a 'U-shaped' pipe having an input end and an output end. Two links connected to a satellite's bent pipe matrix can alternate transmitting to the input end of a bent pipe and monitoring the output end. However, conventional bent pipe architectures may be complex and have bandwidth limitations.

Bandwidth Efficient Modulation (BEM) techniques used with the present invention overcome downlink channel bandwidth limitations by maximizing the use of available spectrum while retaining reasonable power efficiency and system complexity. An example of BEM is disclosed by Diana M. Johnson and Tien M. Nguyen in an article entitled, "Bandwidth-Efficient Modulation Through Gaussian Minimum Shift Keying," Crosslink magazine, Vol. 3, No. 1 (Winter 2001/2002), incorporated herein by reference. For example, with Gaussian minimum shift keying (GMSK), rectangular pulses are converted into Gaussian-shaped pulses, smoothing the phase of the resulting carrier signal. By using an intensity modulator and a phase modulator in sequence, any of the BEM constellations can be generated directly at the optical carrier. By using an optical heterodyne downconverter at a relay satellite, the IF conventionally used in a bent pipe switching matrix is generated and fed directly to the downlink. The resulting architecture is compatible with existing RF architecture, allowing for a smooth transition for conventional RF systems to a use of a direct photonic M-ary digital signaling constellation generator. A BEM constellation is described in terms of a set of basis vectors that have endpoints in the complex plane. When using a zero-phase Mach-Zehnder amplitude modulator, the amplitudes are all generated on the zero-phase vector in the complex plane. The phase modulator 22 rotates these amplitudes to the positions in the complex plane required to realize the signal states (basis vectors) of the BEM constellation. While it is not necessary to use the zero-phase Mach-Zehnder, a simpler system design results from doing so.

By forming the intensity modulator 12 and the phase modulator 22 into a single package, such as when using a Mach-Zehnder intensity modulator, a proper relationship can be implemented and controlled between the optical delays and the electrical delays within the single package. In this manner, the amplitude and phase signals can be applied to the inputs aligned in time, the package implementing the proper delay to achieve correct overlap of the amplitude symbol and the phase symbol. This is the only portion of the optical link apparatus that is implemented in a single substrate. The laser cannot be combined onto the substrate because of the need for narrow bandwidth lasers with linewidths and frequency/phase stabilities that can only be achieved by using solid state or external cavity laser configurations. Multi-chip module (MCM) techniques can be used for packaging the PROMs, the D/A converters, the D/A to modulator amplifiers, and the heterodyne downconverter (laser, photodiode(s), and photodiode amplifier) used in a receiver.

The M-ary intensity-phase constellation being generated by the optical phase modulator 22 is output via output optical fibers 23 to an optical transmission network (not shown). The optical transmission network thereby transmits an optical signal that is an M-ary signaling constellation of signal vectors for M-ary modulations resulting from the PROM being programmed to cause an M-ary signal vector to be produced for each of N data bits in the received M-ary data word. The optical transmission network may include a wavelength division multiplexer, a wavelength division de-multiplexer, an optical-to-optical frequency converter, an optical fiber segment, a free space laser transmission segment, an optical amplifier, an optical filter, a bandpass flattening device, an optical switch, and/or a wavelength drop/add filter. When the optical network includes free space, an output lens and associated interface optics (not shown) may be used for outputting a modulated signal from the optical fibers 23, the lens being similar to that disclosed for example in U.S. Pat. No. 6,370,290, granted to Ball et al., incorporated herein by reference.

Figure 3:
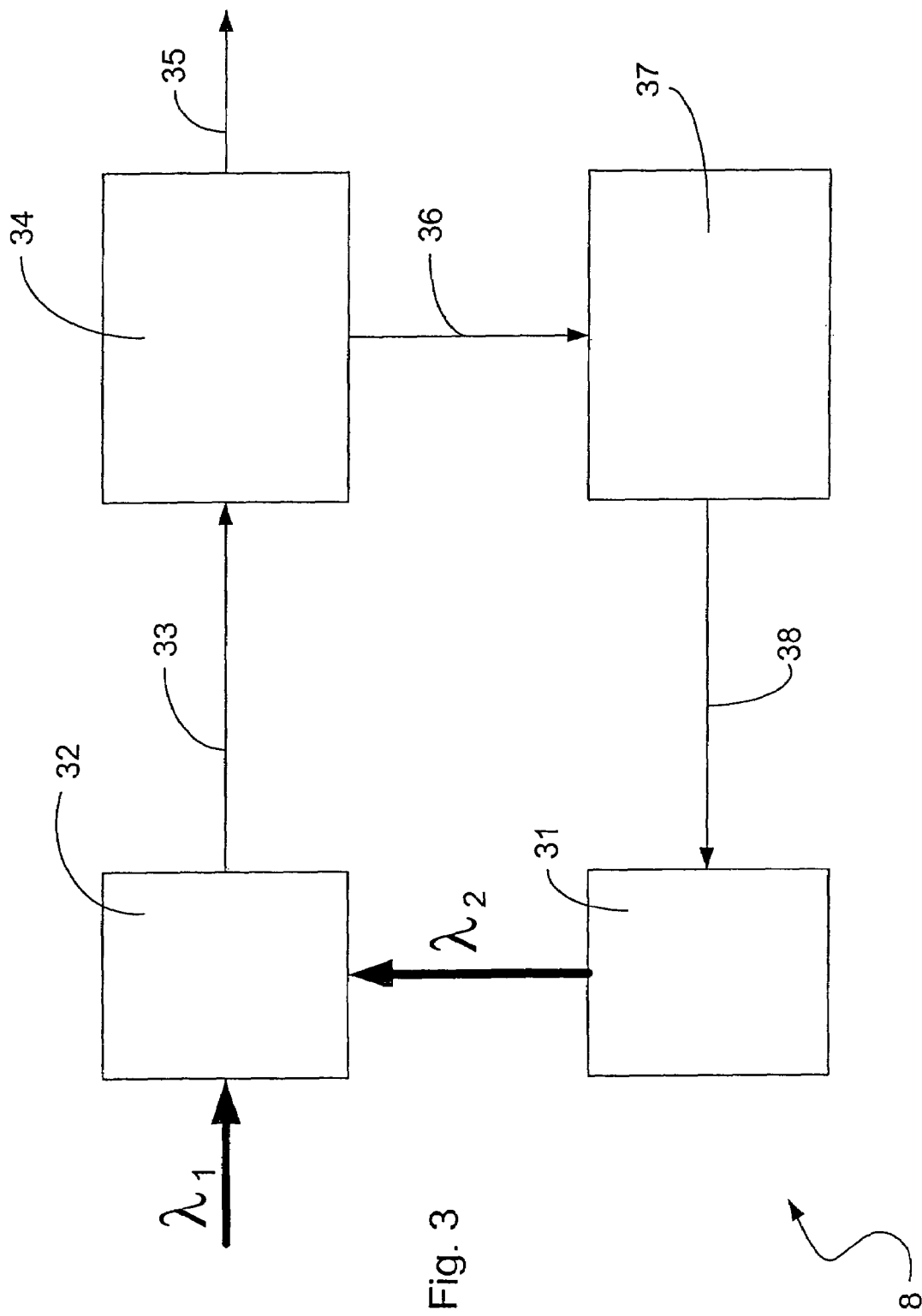
FIG. 3 is a block diagram of a frequency-locked heterodyne photonic downconverter portion of an optical receiver of the optical communication system of FIG. 1 in an exemplary embodiment according to the present invention.

An optical signal received from the optical transmission network by the optical receiver 8 can then be converted from an optical signal to a radio frequency (RF) signal using a downconverter, such as the photonic downconverter shown in FIG. 3 that includes a laser local oscillator 31 and a downconverter/photodiode detector 32.

The coherent converter of FIG. 2 can generate signal vectors that form basis vectors in signal constellations used in coherent M-ary modulation, thereby achieving bandwidth efficient modulation. In other words, the coherent converter generates basis vectors in constellations of bandwidth efficient modulation schemes at optical wavelengths. As a result, the above-mentioned reduction in complexity, weight, and power consumption is accomplished. The basis vectors modulate an optical signal that is subsequently transmitted by fiber optic transmitting, free space optical transmitting, or by a combination of fiber optic and free space transmitting. When the coherent converter of FIG. 2 is used for free space transmission to the receiver 8, a distance in free space is typically up to 77 million meters, although longer distance applications are envisaged. The optical signal is transmitted to the receiver 8 which downconverts the plurality of M-ary coherent optical signals to RF signals using the detector 32 having a photodiode detector and a mixer that receives a signal from the laser local oscillator 31. Data may then be recovered by demodulating the RF signals using RF demodulators. The downconverting and optical-to-RF conversion may be separated from the demodulation and data recovery by using an intervening RF link (not shown) therebetween.

The receiver 8 may include a low noise optical amplifier, a wavelength division demultiplexer, a narrowband optical bandpass filter, and/or an optical switch. The receiver 8 may immediately demodulate the RF signal or provide the RF signal to an input of an RF link that transmits the RF signal to a ground-based receiver. The RF link can be composed of individual RF links in succession, each of the RF links being connected at an intermediate frequency (IF) point. In addition, a number of RF switching matrices may be disposed in the RF link, along with frequency converters, bandpass filters, and pre- and post-equalizers at various points in an RF portion of the system.

FIG. 3 depicts a frequency-locked heterodyne photonic downconverter used in the receiver 8 in an exemplary embodiment. In FIG. 3, the tunable laser local oscillator (LO) 31 is a narrow linewidth laser that is temperature tuned to place a hetereodyned output frequency at a nominal value. Preferably, the LO 31 uses a laser that may be the same as the laser master oscillator 11 used in the constellation generator of FIG. 2, except that the oscillator 11 is stable whereas the LO 31 is tunable. Typically, the laser of the LO 31 has a thermal tuning range from at least 10 GHz to over 30 GHz, but since a much smaller tuning range is used for regulating the RF frequency, a precision voltage controller may be utilized for obtaining highly accurate incremental control of an analog voltage controlling the laser frequency. The output of the LO 31 (represented as $\lambda_2$) is fed to the detector 32 which includes an optical mixer that downconverts an optical input signal (XI, received by the receiver 8 from the transmitter 6) into an intermediate frequency (IF) electrical signal 33. The output 33 of the detector 32 is fed to an IF amplifier 34 via an RF transmission line. The IF amplifier 34 has an automatic gain control (AGC), bandpass filtering, and a power splitter. The IF amplifier 34 creates and transmits an IF signal 36 on an RF transmission line to a frequency locked loop controller 37, which provides a laser tuning control variable 38 to the LO 31. The controller 37 uses a temperature tuning having a time constant that is rapid enough to initially acquire the downconverted signal from the IF amplifier 34 and to track out the physical effects that cause the frequency of the LO 31 to depart from its nominal value. The frequency locked loop of FIG. 3 does not require a high bandwidth and is very easy to construct compared with conventional optical phase locked loops. For example, for determining the frequency of the signals being output by the detector 32 onto the RF transmission line, a phase translation circuit (not shown) may be coupled to the IF amplifier portion 34, the phase translation circuit including a microprocessor which converts the phase information from the IF amplifier 34 into frequency information indicative of the frequency of the signals in the RF transmission line. In this example, the frequency information in the IF signal 36 is obtained by the frequency locked loop controller 37 via the RF transmission line. The RF transmission lines passing signals 33 and 36 may be calibrated so that no distortion is present in the RF signals. The frequency locked loop controller 37 outputs the laser tuning control variable 38 for tuning (adjusting) the frequency being output by the laser of LO 31, the tuning being based on a deviation from a nominal frequency of the intermediate IF signal 33.

The laser of the LO 31 does not have to be phase locked to the output radio frequency, but is required to be frequency locked. In other words, the output frequency of the heterodyned output is maintained to be as close as possible to a nominal value. In a satellite communications system, Doppler effect can be significant. A frequency locked heterodyne apparatus such as that shown in FIG. 3 can effectively remove Doppler effects. The optical frequency and phase of the optical signal relative to the frequency and phase of the LO 31 are preserved, including any phase and frequency fluctuations, since the LO 31 is an amplitude- and phase-stable laser, preferably identical to the laser master oscillator 11 used on the front end. The heterodyned combination of ultra-stable sources 11 and 31 generates an intermediate frequency (IF) in the microwave region, where the spectral spread of the heterodyned signal is the combined spectral spread of the incoming optical signal and that of the LO 31. The sum of linewidths of the signal and the LO 31 is much less than the receiver bandwidth. The LO 31 allows the use of electrical filtering on the downconverted signal, filtering which is much narrower than practical optical filters, permitting the rejection of out of band noise, which yields a larger information-carrying component of the detected photocurrent and resultant higher signal-to-noise compared with a direct detection. The local oscillator and signal fields occupy the same spatial modes. Modes orthogonal to that of the LO 31 are rejected. Only matching polarization components contribute to the detection process. The use of high quality lasers in the system reduces source phase noise, which allows modulation such as PSK for M-ary signaling, and which improves overall receiver sensitivity.

The output of the IF amplifier 34 is also provided, via an RF transmission line 35 to a bent-pipe switch matrix feeding an RF M-ary demodulator (not shown) that uses an RF phase locked loop when the demodulator is analog, and that uses a digital phase locked loop when the demodulator is digital. The RF M-ary demodulator generates the reference frequency used in in-phase and quadrature detectors that recover the signal vectors which make up the basis vector set for the M-ary modulation scheme. The demodulator phase locked loops compensate for the use of the optical frequency locked loop in the optical-to-IF heterodyne downconverter of FIG. 3. The demodulator also recovers the symbol clock and performs mapping of the received signal vector into the digital data sequence that corresponds to the signal vector.

In conventional medium to long span fiber-optic based communication links, spreading of the signal symbols with distance is reduced, thereby reducing intersymbol interference, if there is no phase modulation accompanying the amplitude modulation. Similarly, the spreading of energy into adjacent channels is reduced, thereby reducing adjacent channel interference, if there is no phase modulation accompanying the amplitude modulation. By contrast, the present invention combines phase modulation with amplitude modulation in a unique new architecture. The new architecture is one in which there is no electronic data recovery at the relay nodes, and often not even at the switching node. Instead, the data is put on separate wavelengths, and the relay node simply filters and then amplifies the optical signals, and sends the data on to the next link. At the switching nodes, the wavelengths are separated in a wavelength division multiplexer and passed through an optical switch that sorts the communication links on a per-wavelength basis, then re-assembles the wavelengths for the next link segment using a wavelength division multiplexer. Where wavelength conflicts arise, the optical-to-optical converter is used to change the wavelength to one which is available on the output link. The data is finally recovered in electronic form at the central office or, for high volume users, on the user's premises.

By further comparison, some conventional architectures effect an optical link communication system according to a scheme that is a so called 'demodulation-switching-remodulation' scheme, as discussed above. This type of conventional system includes demodulators, switches, and remodulators in a satellite, where the switches alone weigh hundreds of pounds and consume hundreds of watts of power. By contrast, the present invention allows a huge weight, cost, and power reduction with higher performance by employing, for example, a wavelength division multiplexed, optically switched network that utilizes space-based laser communications.

The optical link of the present invention may be employed in the optical communication system 5 that is disposed aboard a communications satellite. The system 5 can further include a constellation of satellites that uses the heterodyne downconverter for an intra-satellite communication network element. In such a system, a phased array receiving antenna is used to digitize a received signal at the array element. The M-ary nature of the modulation formats allows all the analog-to-digital (A/D) converter output bits for each sample to be brought back to an array processor as a single symbol. For example, when using the Dallas Semiconductor MAXIM 8 bit MAX 108 A/D converter at a sample rate of 1500 MSamples/sec., it is only necessary to support a symbol rate of 1500 Msymbols/sec. in order to transfer a 12 Gb/sec. data stream.

The local oscillator 31 and photodiode detector 32, which are used as a heterodyne downconverter, may be part of a laser communication system disposed aboard a satellite. In a space-based laser communication system aboard a satellite, it is quite advantageous for meeting weight and power (SWaP) requirements to form the modulator, composed of a Mach-Zehnder interferometer and an optical phase modulator, into a single package.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to provide an exemplary explanation for practicing the invention and to enable others skilled in the art to utilize the invention in such, or other, embodiments and with various modifications required by the particular applications or uses of the present invention. It is intended that the spirit of the present invention include equivalents and alternative embodiments that would be readily apparent to one skilled in the art. It is intended that the scope of the present invention is defined by the appended claims.

What is claimed is:

1. An optical link, comprising:
   a laser oscillator that generates an amplitude- and phase-stable narrow linewidth optical carrier:
   a mapping device that obtains a data word and maps bits of the word into intensity-phase space:
   a digital-to-analog (D/A) conversion device that obtains mapped bits from the mapping device and generates respective analog signals corresponding to a symbol radius and a symbol angle for the mapped bits;
   an intensity modulator that intensity modulates the amplitude- and phase-stable narrow linewidth optical carrier based on the symbol radius analog signal, thereby obtaining an optical intensity-modulated symbol; and
   a phase modulator that phase modulates the optical intensity-modulated symbol based on the symbol angle analog signal.

2. An optical link as claimed in claim 1, wherein the intensity modulator is a Mach-Zehnder modulator.

3. An optical link as claimed in claim 1, wherein the intensity modulator is an electro absorption intensity modulator.

4. An optical link as claimed in claim 1, wherein the intensity modulator is an intensity-modulating external cavity laser diode.

5. An optical link as claimed in claim 1, wherein the phase modulator generates signal vectors that make up basis vectors in signal constellations of coherent M-ary modulation.

6. An optical link as claimed in claim 5, wherein the modulation includes bandwidth efficient modulation.

7. An optical link as claimed in claim 5, further including a transmitter that transmits the signal vectors by a free space optical link.

8. An optical link as claimed in claim 5, further including a transmitter that transmits the signal vectors by a fiber optic link.

9. An optical link as claimed in claim 1, wherein the data word comprises an M-ary data word, the optical link further including a D/A converter that converts the amplitude-encoded M-ary data word and the phase-encoded M-ary data word from digital signals to analog signals.

10. An optical link as claimed in claim 1, further including an optical fiber that delays the optical intensity-modulated symbol.

11. An optical link as claimed in claim 9, further including a plurality of transmission lines for transmitting the analog signals from the D/A converter to the intensity modulator and the phase modulator.

12. An optical link as claimed in claim 11, wherein lengths of the transmission lines are adjustable.

13. An optical link as claimed in claim 12, wherein a length of at least one of the transmission lines is adjusted so that the optical intensity-modulated symbol and an analog voltage defining a phase for that symbol arrive at the phase modulator at substantially the same time.

14. An optical link as claimed in claim 1, wherein the data word comprises an M-ary data word, the optical link further including a power splitter that obtains the M-ary data word and splits the M-ary data word into in-phase and quadrature components.

15. An optical link as claimed in claim 14, further including a read-only memory (ROM) that maps bits of the in-phase and quadrature components into symbols in intensity-phase space.

16. An optical link as claimed in claim 7, wherein the signal vectors comprise M-ary coherent optical signals with M greater than four, the optical link further including:
a downconverter that downconverts the optical signals to signals in the radio frequency (RF) range; and
a demodulator that demodulates the downconverted signals and recovers the M-ary data word.

17. An optical link as claimed in claim 1, wherein the data word comprises an M-ary data word, and wherein the mapping device includes:
a first read-only memory (ROM) having an input for receiving a first portion of the M-ary data word, the first ROM amplitude-encoding the first portion; and
a second ROM that receives a second portion of the M-ary data word, the second ROM phase-encoding the second portion.

18. An optical link as claimed in claim 1, wherein the intensity modulator and the phase modulator include a Mach-Zehnder intensity modulator and an optical phase modulator that are formed into a single package.

19. An optical link as claimed in claim 1, wherein the phase- and intensity-modulated symbol includes at least one vector in a signal constellation of coherent Wary modulation.

20. An optical link as claimed in claim 19, wherein a plurality of vectors comprise M-ary coherent optical signals with M greater than four the link further including a downconverter that converts the optical signals to signals in the radio frequency (RF) range, the downconverter including a variable-frequency laser local oscillator (LO).

21. An optical link as claimed in claim 20, further including a frequency locked loop controller that controls an output frequency of the variable-frequency laser LO, the output frequency of the LO controlling a frequency of the signals in the RF range.

22. An optical link as claimed in claim 20, further including a power splitter that splits the signals in the RF range into in-phase and quadrature components.

23. An optical link as claimed in claim 20, further including a switch matrix that obtains the signals in the RF range.

24. An optical link as claimed in claim 1, further including an optical wave that connects an output of the intensity modulator to an input of the phase modulator.

25. An optical link as claimed in claim 24, wherein the optical waveguide includes one of an optical fiber, an optical waveguide fabricated on an integrated Mach-Zehnder amplitude modulator/phase modulator, and an optical waveguide fabricated on an integrated electro absorption modulator/phase modulator.

26. An optical link as claimed in claim 1, further including:
an output optical fiber that obtains a modulated signal from an output of the phase modulator: and
an optical transmission network connected to the output optical fiber to transmit the modulated signal as an optical signal.

27. An optical link as claimed in claim 26, wherein the optical transmission network includes at least one of a wavelength division multiplexer, a wavelength division de-multiplexer, an optical-to-optical frequency converter, an optical fiber segment, a free space laser transmission segment, an optical amplifier, an optical filter, a bandpass flattening device, an optical switch, and a wavelength drop/add filter.

28. An optical link as claimed in claim 1, wherein the data word is a received M-ary data word, the link producing signal vectors for M-ary modulations when the mapping device is programmed to cause an M-ary signal vector to be produced for each of N data bits in the received M-ary data word.

29. An optical link as claimed in claim 21, wherein the laser LO includes a narrow linewidth laser that is temperature tuned to place the frequency of the signals in the RF range at a nominal value.

30. An optical link as claimed in claim 1, wherein the intensity modulator includes a laser diode having an external cavity.

31. An optical link as claimed in claim 30, wherein the laser diode is coupled to a Bragg grating written into an optical fiber.

32. An optical link as claimed in claim 30, wherein the laser diode is coupled to a Lippman-Metcalf cavity.

33. An optical link as claimed in claim 1, wherein the optical carrier generated by the laser oscillator has a wavelength of approximately 1.54 microns.

34. An optical link, comprising:
a laser oscillator that generates an amplitude- and phase-stable narrow linewidth optical carrier;
a mapping device that obtains an M-ary data word and maps bits of the M-ary data word into intensity-phase space;
a power splitter that obtains the M-ary data word and splits the M-ary data word into in-phase and quadrature components;
a read-only memory (ROM) that maps bits of the in-phase and quadrature components into symbols in intensity-phase space;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol; and a phase modulator that phase modulates the optical intensity-modulated symbol based on the symbol angle analog signal.

35. An optical link, comprising:

a laser oscillator that generates an amplitude- and phase-stable narrow linewidth optical carrier;

a mapping device that obtains an M-ary data word and maps bits of the M-ary data word into intensity-phase space, wherein the mapping device includes a first read-only memory (ROM) having an input for receiving a first portion of the M-ary data word and a second ROM that receives a second portion of the M-ary data word, the first ROM amplitude-encoding the first portion and the second ROM phase-encoding the second portion;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol; and a phase modulator that phase modulates the optical intensity-modulated symbol based on the symbol angle analog signal.

36. An optical link, comprising:

a laser oscillator that generates an amplitude- and phase-stable narrow linewidth optical carrier;

a mapping device that obtains a data word and maps bits of the word into intensity-phase space;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol;

a phase modulator that phase modulates the optical intensity-modulated symbol based on the symbol angle analog signal thereby obtaining a phase- and intensity-modulated symbol, wherein the phase- and intensity-modulated symbol includes at least one vector in a signal constellation of coherent M-ary modulation;

a downconverter, wherein a plurality of vectors comprise M-ary coherent optical signals with M greater than four, that converts the optical signals to signals in the radio frequency (RF) range, the downconverter including a variable-frequency laser local oscillator (LO); and a frequency locked loop controller that controls an output frequency of the variable-frequency laser LO, the output frequency of the LO controlling a frequency of the signals in the RF range.

37. An optical link as claimed in claim 36, wherein the laser LO includes a narrow linewidth laser that is temperature tuned to place the frequency of the signals in the RF range at a nominal value.

38. An optical link, comprising:

a laser oscillator that generates an amplitude- and phase-stable narrow linewidth optical carrier;

a mapping device that obtains a word and maps bits of the word into intensity-phase space;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol; and a phase modulator that phase modulates the optical intensity-modulated symbol based on the symbol angle analog signal;

wherein the data word is a received M-ary data word, the optical link producing signal vectors for M-ary modulations when the mapping device is programmed to cause an M-ary signal vector to be produced for each of N data bits in the received M-ary data word.

39. An optical link, comprising:

a laser oscillator that generates an amplitude- and phase-stable narrow linewidth optical carrier;

a mapping device that obtains a data word and maps bits of the word into intensity-phase space;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol, wherein the intensity modulator includes a laser diode having an external cavity, and wherein the laser diode is coupled to a Bragg grating written into an optical fiber; and a phase modulator that phase modulates the optical intensity-modulated symbol based on the symbol angle analog signal.

40. An optical link, comprising:

a laser oscillator that generates an amplitude- and phase-stable narrow linewidth optical carrier;

a mapping device that obtains a data word and maps bits of the word into intensity-phase space;

a digital-to-analog (D/A) conversion device that obtains mapped bits from the mapping device and generates respective analog signals corresponding to a symbol radius and a symbol angle for the mapped bits;

an intensity modulator that intensity modulates the amplitude- and phase-stable narrow linewidth optical carrier based on the symbol radius analog signal, thereby obtaining an optical intensity-modulated symbol, wherein the intensity modulator includes a laser diode having an external cavity, and wherein the laser diode is coupled to a Lippman-Metcalf cavity; and a phase modulator that phase modulates the optical intensity-modulated symbol based on the symbol angle analog signal.

* * * * *